(12) United States Patent
Harlin (10) Patent No.: US 12,219,094 B2
(45) Date of Patent: *Feb. 4, 2025

(54) LIVE ASSIST SYSTEMS AND METHODS WITH REAL TIME SCORING OF AGENT PERFORMANCE

(71) Applicant: OPEN TEXT HOLDINGS, INC., San Mateo, CA (US)

(72) Inventor: Danny Ray Harlin, Frisco, TX (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,113

(22) Filed: Apr. 19, 2024

(65) Prior Publication Data

US 2024/0267466 A1  Aug. 8, 2024

Related U.S. Application Data

(63) Continuation of application No. 17/893,988, filed on Aug. 23, 2022, now Pat. No. 11,991,310.

(60) Provisional application No. 63/399,539, filed on Aug. 19, 2022.

(51) Int. Cl.
| | |
|---|---|
| *H04M 3/51* | (2006.01) |
| *G06F 40/205* | (2020.01) |
| *G06F 40/30* | (2020.01) |
| *G10L 15/18* | (2013.01) |
| *G10L 15/22* | (2006.01) |
| *G10L 15/30* | (2013.01) |

(52) U.S. Cl.
CPC ........ *H04M 3/5175* (2013.01); *G06F 40/205* (2020.01); *G06F 40/30* (2020.01); *G10L 15/1815* (2013.01); *G10L 15/22* (2013.01); *G10L 15/30* (2013.01)

(58) Field of Classification Search
None
See application file for complete search history.

(56) References Cited

U.S. PATENT DOCUMENTS

| 11,575,791 | B1* | 2/2023 | Arsanjani | ........... | H04M 3/5175 |
| 11,991,310 | B2* | 5/2024 | Harlin | .................. | G10L 15/1815 |
| 2008/0152122 | A1* | 6/2008 | Idan | .................... | H04M 3/5175 |
| | | | | | 379/265.07 |
| 2014/0044250 | A1* | 2/2014 | Gartner | ............... | H04M 3/5175 |
| | | | | | 379/265.09 |

(Continued)

*Primary Examiner* — Harry S Hong
(74) *Attorney, Agent, or Firm* — Sprinkle IP Law Group (57) ABSTRACT

A new approach to agent performance evaluation includes real-time transcription of a call or chat from a customer and a real-time scorecard analysis performed on an agent's device as the agent and the customer communicate with each other. The real-time scorecard analysis may be conducted based on a set of live score rules from the server side. The agent can get an immediate scoring feedback through a user interface on the agent's device. Additional analyses, such as a sentiment analysis, a summary analysis, etc., can be performed on the server side and displayed to the agent through the user interface on the agent's device. The agent's automatically generated performance score can be made available to the agent's manager, on-demand and/or in real time, allowing the manager to monitor, evaluate, and/or manage the agent's performance even as the agent converses or chats with the customer.

20 Claims, 8 Drawing Sheets

(56) References Cited

U.S. PATENT DOCUMENTS

| | | | |
|---|---|---|---|
| 2015/0195406 A1* | 7/2015 | Dwyer | G10L 25/72 |
| | | | 379/265.07 |
| 2017/0013127 A1* | 1/2017 | Xue | G10L 15/02 |
| 2019/0050875 A1* | 2/2019 | McCord | G06F 40/242 |
| 2019/0295098 A1* | 9/2019 | Banipal | G06Q 30/016 |
| 2021/0157834 A1* | 5/2021 | Sivasubramanian | |
| | | | G06F 16/686 |
| 2023/0045930 A1* | 2/2023 | Can | G10L 15/08 |
| 2024/0064238 A1* | 2/2024 | Harlin | G06F 40/30 |

* cited by examiner

LIVE ASSIST SYSTEMS AND METHODS WITH REAL TIME SCORING OF AGENT PERFORMANCE

CROSS-REFERENCE TO RELATED APPLICATIONS

This application is a continuation of, and claims a benefit of priority under 35 U.S.C. § 120 from, U.S. patent application Ser. No. 17/893,988, filed Aug. 23, 2022, issued as U.S. Pat. No. 11,991,310, entitled "LIVE ASSIST SYSTEMS AND METHODS WITH REAL TIME SCORING OF AGENT PERFORMANCE," which claims a benefit of priority from U.S. Provisional Application No. 63/399,539, filed Aug. 19, 2022, entitled "LIVE ASSIST SYSTEMS AND METHODS WITH REAL TIME SCORING OF AGENT PERFORMANCE," both of which are fully incorporated by reference herein for all purposes.

TECHNICAL FIELD

This disclosure relates generally to customer relationship management. More particularly, this disclosure relates to live assist systems, methods, and computer program products with real-time scoring of agent performance.

BACKGROUND OF THE RELATED ART

Large organizations use call centers to handle customer calls and other calls. Typically, each call center is equipped with telecommunications devices programmed to route incoming calls to call center agents having particular skills or expertise.

In some cases, a call may be recorded for various reasons such as quality assurance, compliance management, training, and so on. The recording can be used to evaluate the performance of the call center agent, referred to hereinafter as the "agent," who answered the call. Typically, a manager may listen to the recording of the call and, based on the exchange between the agent and the customer who called, determine how well the agent handled the call. This process is referred to herein as a 'post-call' agent performance evaluation process.

In a 'post-call' agent performance evaluation process, a recording of a call would be stored until a manager can schedule time to perform a manual review to determine how well an agent performed in handling a call from a customer. Depending upon the manager's schedule and the length of the recording, this post-call manual review can take time and be quite time consuming. Further, the post-call manual review can be somewhat arbitrary and inconsistent as the result may largely depend on which manager performs the manual review and the experience of that manager in agent performance evaluation.

After the manager conducts the post-call manual review, both the manager and the agent would then schedule a meeting to discuss the result of the manager's manual review. The feedback from that meeting is reviewed by both the manager and the agent.

In some cases, a post-call agent performance evaluation process may leverage auto-scoring technology. Implementation details may vary depending upon where a recording is stored and what methodology is utilized for auto-scoring. The auto-scoring can be done by converting the recording to text using, for example, a speech-to-text conversion tool, and applying scorecard rules to the text converted from the recording to produce a score that indicates an agent's performance in the particular recording.

With this kind of post-call agent evaluation process, a manager reviews the score produced by the auto-scoring technology. Optionally, the manager may also manually review the recording. Similar to the post-call agent performance evaluation process described above, both the manager and the agent would then schedule a meeting to discuss the result of the manager's review. The feedback from that meeting is reviewed by the manager and the agent.

SUMMARY OF THE DISCLOSURE

In view of the post-call agent performance evaluation approaches discussed above, an object of this disclosure is to significantly reduce the time needed to evaluate an agent's performance and provide feedback to the agent so that the agent can improve performance. Another object is to eliminate the potential subjectivity and inconsistencies of manual reviews in agent performance evaluation.

In this disclosure, these and other objects can be realized through a new approach to agent performance evaluation. Unlike the 'post-call' agent performance evaluation approaches discussed above, this new approach leverages real-time scoring of agent performance to provide immediate (e.g., in real time or near real time with only operational delays), quantifiable evaluation and feedback to an agent on the agent's performance in handling a call with a customer while the call is ongoing.

In this disclosure, the term "agent" refers to an individual who serves as a representative of an entity (e.g., a company, organization, enterprise, etc.) in answering a call from a customer of the entity through a call center. A customer service representative is an example of such an agent.

As an example, a call center may utilize a live assist system to process incoming calls or chats and provide real-time assistance to agents such as real-time speech analytics. When a call or chat from a customer is routed by the live assist system to an agent, a user interface is generated and provided to the agent on a client device. As before, the call is recorded. Additionally, the user interface may record the agent's interaction with the customer captured by the user interface.

As the agent and the customer converse (via a phone line or a chat channel provided through the user interface), the conversation is transcribed to text and analyzed on the server side for sentiment and summary. Meanwhile, a scorecard analysis is performed by a live score keeper module on the client side. In some embodiments, the scorecard analysis can be performed based on a set of live score rules. In some embodiments, the set of live score rules may be stored in a database and propagated to the agent's device from a live score rule server.

In some embodiments, a score resulted from the scorecard analysis is displayed via the user interface to the agent in real time, while the agent is conversing or chatting with the customer. In some embodiments, the score is made accessible to a manager of the agent so that the score is available for review by the manager on-demand in real time, even as the agent is conversing or chatting with the customer. In some embodiments, the score is stored for later use, for instance, in a post-call analysis.

In some embodiments, upon an agent logging into a live score rule service, a live score keeper on a user device of the agent fetches a live score rule set from the live score rule service, parses the live score rule set with respect to the agent to determine what rules are assigned to the agent and stores the parsed rules locally on the user device of the agent. At this point, the live score agent is ready for scoring the agent's performance in real time and awaits a notification that a call has started.

In some embodiments, the live score keeper receives a notification that a call has started and subscribes to a voice-to-text conversion and sentiment analysis service. In some embodiments, a real-time agent performance evaluation process includes receiving, by the live score keeper through the voice-to-text conversion and sentiment analysis service, a transcript stream and a sentiment stream as the call is ongoing between the agent and a customer, the transcript stream including a current transcription of the call, the sentiment stream including a current sentiment of the call; scoring, by the live score keeper utilizing the transcript stream, the sentiment stream, and live score rules, performance of the agent, the scoring producing a current score that is indicative of the performance of the agent in real time as the call with the customer is ongoing; and displaying, by the live score keeper, the current score via a user interface on the user device of the agent. In some embodiments, the real-time agent performance evaluation process includes continuously performing the receiving, the scoring, and the displaying until the call is terminated.

In some embodiments, the live score keeper includes a rule scanner configured for scanning the locally stored live score rules one rule at a time and applying the rule to the current transcription of the call and the current sentiment of the call. In some embodiments, the live score keeper further includes a buffer for storing the current transcription of the call and the current sentiment of the call in a buffer as the transcript stream and the sentiment stream arrive at the live score keeper.

In some embodiments, the live score rules are displayed to the agent on the user device of the agent. As the agent completes a rule, the completed rule displayed on the user device is checked off. This helps the agent to keep track of his actions which, in turn, can help improving the agent's performance.

In some embodiments, once the call is ended or otherwise terminated, a history of the scoring as the call progressed, a history of sentiments of the agent and the customer, a final score, a final sentiment, and rules during the call are communicated to the server side and stored in a database for later use, for instance, in a 'post-call' review.

With the new real-time approach to agent performance evaluation, the time needed to evaluate an agent's performance in handling a call with a customer is significantly reduced. Further, the potential subjectivity and inconsistencies of manual reviews in evaluating the agent's performance is eliminated.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 1 depicts a diagrammatic representation of an example of a system implementing a real-time agent performance evaluation process according to some embodiments disclosed herein.

FIG. 2 depicts a diagrammatic representation of another example of a system implementing a real-time agent performance evaluation process with client-side and server-side components according to some embodiments disclosed herein.

FIG. 3 illustrates an example of how a client-side component obtains a rule set from a server-side component according to some embodiments disclosed herein.

FIG. 4 illustrates an example of how client-side and server-side components work in concert to provide real-time agent performance evaluation and feedback according to some embodiments disclosed herein.

FIG. 5 depicts a diagrammatic representation of a client-side component according to some embodiments disclosed herein.

FIG. 6 depicts a diagrammatic representation of an example of a user interface that shows a real-time agent performance score according to some embodiments disclosed herein.

FIG. 7 depicts a diagrammatic representation of an example of a user interface that shows a rule set to an agent as the agent is conversing or chatting with a customer, according to some embodiments disclosed herein.

FIGS. 8A-8B are flow charts that illustrate an example of a real-time agent performance evaluation process according to some embodiments disclosed herein.

FIG. 9 depicts a diagrammatic representation of a distributed network computing environment where embodiments disclosed can be implemented.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As alluded to above, a call center may record incoming calls for various reasons (e.g., quality assurance, compliance management, training, etc.). For instance, the call center may use a recording of a call between an agent and a customer to review what was discussed in the call and evaluate the performance of the agent in managing customer relationship with the customer. However, the review, the evaluation, and the feedback of agent performance all take place based on the past performance of the agent after the call has concluded. This kind of 'post-call' agent performance evaluation process does not have any immediate effect on the agent's performance during the call with the customer.

This disclosure provides a real-time approach to agent performance evaluation. This approach leverages the real-time transcription of a call or chat from a customer and includes performing a real-time scorecard analysis on an agent's device as the agent and the customer communicate with each other. The real-time scorecard analysis may be conducted based on a set of live score rules from the server side. The live score rules may vary from implementation to implementation. The agent gets immediate scoring feedback through a user interface presented on the agent's device. Additional analyses such as a sentiment analysis and a summary analysis can be performed on the server side and displayed to the agent through the user interface on the agent's device. The agent's automatically generated performance score can be made available to the agent's manager on-demand and/or in real time, allowing the manager to monitor, evaluate, and/or manage the agent's performance, even as the agent converses or chats with the customer. A non-limiting example of a system implementing a real-time agent performance evaluation process is illustrated in FIG. 1.

Figure 1:
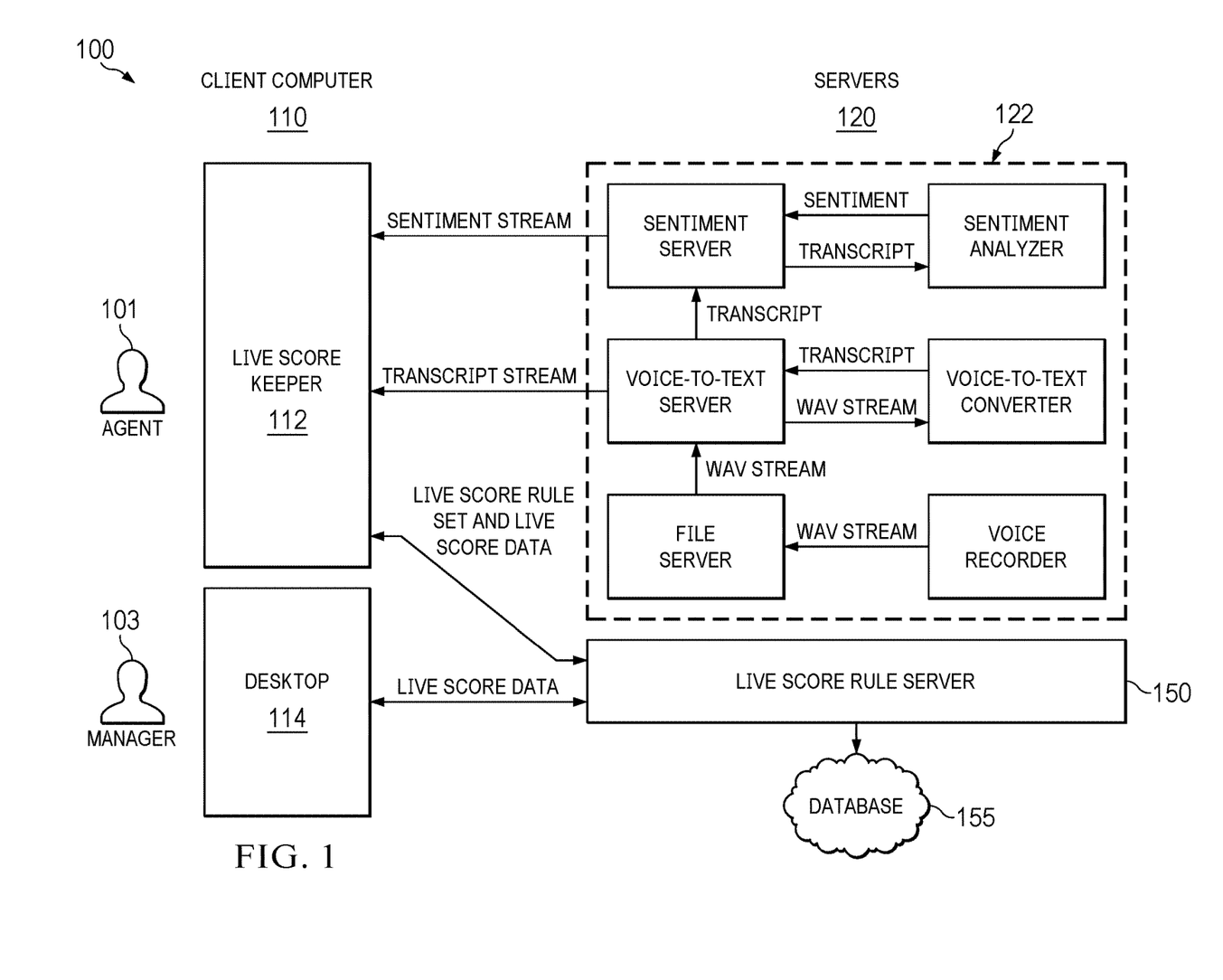

In the example of FIG. 1, a real-time agent performance evaluation system 100 includes a client-side component and server-side components. On the client side, a live score keeper 112 operates on a client computer 110 associated with an agent 101. On the server side, servers 120 can include a live score rule server 150, servers configured for providing services 122, and a database 155 for storing live score data, which is accessible by a manager 103 through, for instance, a desktop computer 114.

The new real-time agent performance evaluation process includes scoring a call between agent 101 and a customer (not shown) on the client side as the agent and the customer communicate. In this way, the agent can get immediate scoring feedback. This process leverages servers 120 to transfer information (e.g., a transcript stream, a sentiment stream, a live score rule set, etc.) to the agent's device. This is further illustrated in FIG. 2.

Figure 2:
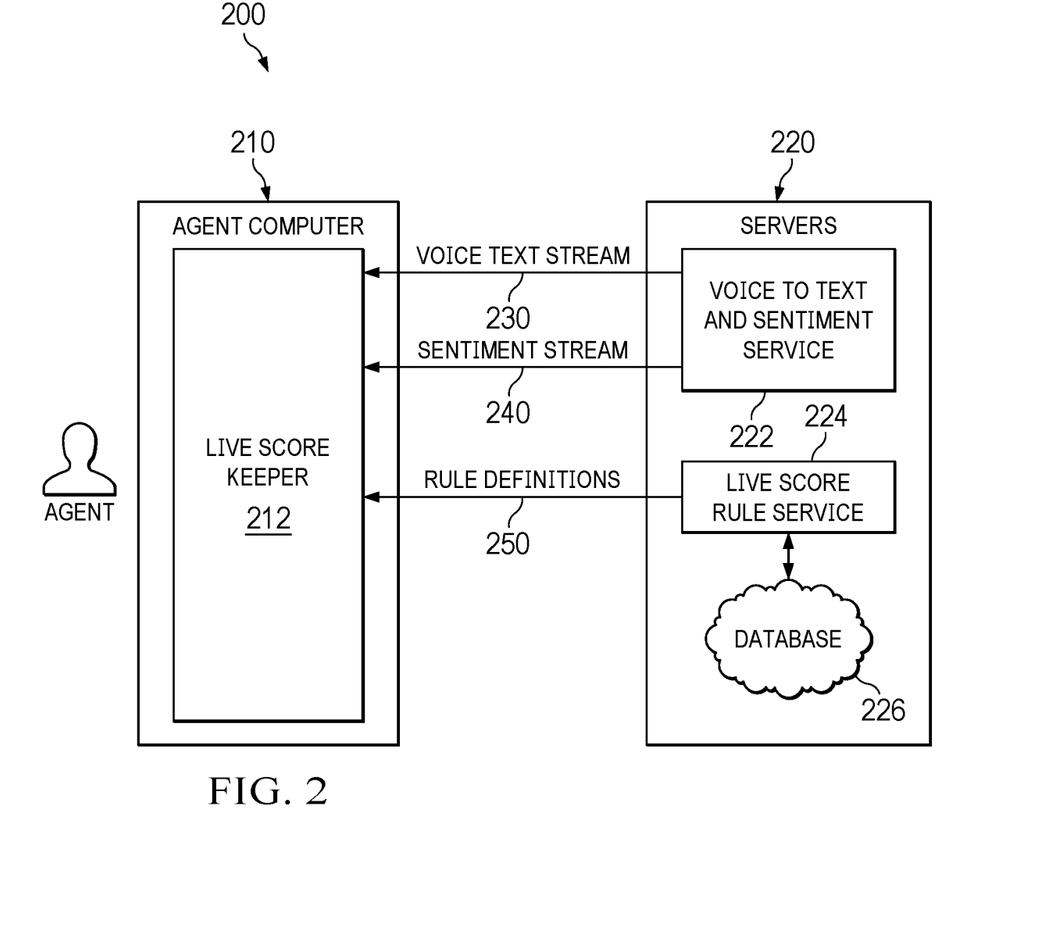

In the example of FIG. 2, a live score keeper 212 continuously scores a call between an agent and a customer (not shown) on an agent computer 210 based on a transcription of the call (via a voice text stream 230) and sentiment data (via a sentiment stream 240) streamed (via a service 222) from the server side (e.g., servers 220) in real time as well as a set of live score rules (via rule definitions 250) provided by a live score rule server (via a live score rule service 224). In some embodiments, live score keeper 212 may implement a score calculation algorithm that applies the live score rule set to the transcription of the call and sentiment data streamed from the server side in real time.

As the call is ongoing, the current score of the call (referred to as live score data) is computed and displayed to the agent on the agent's device (e.g., a user interface on agent computer 210). The current score is continuously updated in real time as the call progresses. In some embodiments, the live score data can be communicated to the server side for storage (e.g., in database 226) and made available for access by managers on demand and/or in real time. Each manager can view multiple team members as each phone call progresses. All the information about the call, including the scoring history and sentiments computed during the call, can be stored in the database for later retrieval and review.

Figure 3:
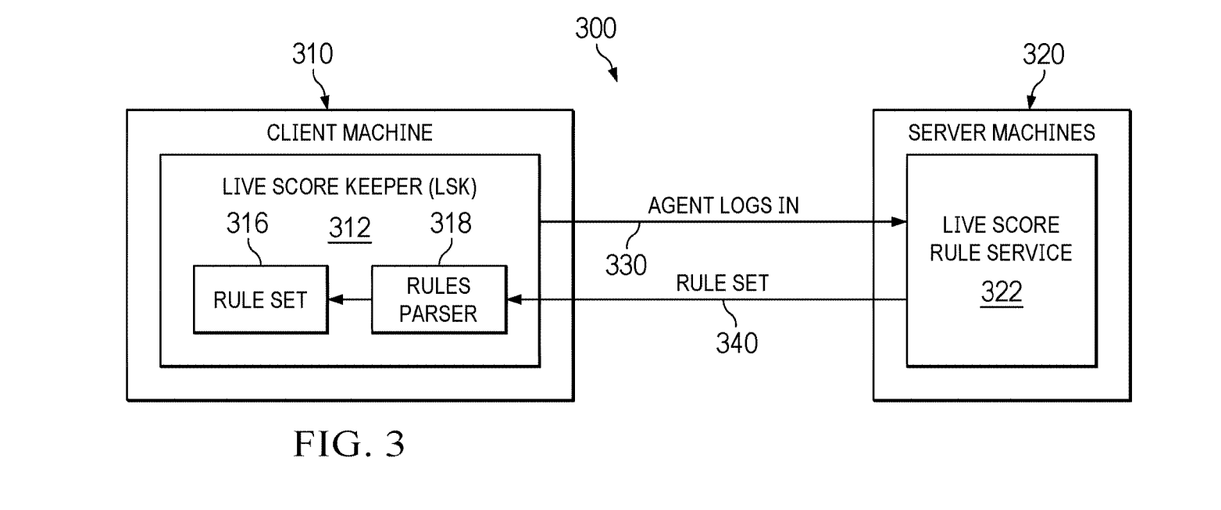

FIG. 3 illustrates an example of how a client-side component, referred to as a live score keeper (LSK) 312, running on a client machine 310 obtains a rule set 316 from a server-side component, referred to as a live score rule service 322, from the server side 320 according to some embodiments disclosed herein. In some embodiments, a data flow 300 may include an agent logging in (with the agent's login information 330) to live score rule service 322 through LSK 312. Upon the agent login, LSK 312 fetches a live score rule set 340 from live score rule service 322.

As illustrated in FIG. 3, in some embodiments, LSK 312 includes a rules parser 318 which is operable to parse live score rule set 340, determine rules assigned to the agent, and store the parsed rules in rule set 316. At this point, LSK 312 is ready for live scoring and awaits a customer call.

Figure 4:
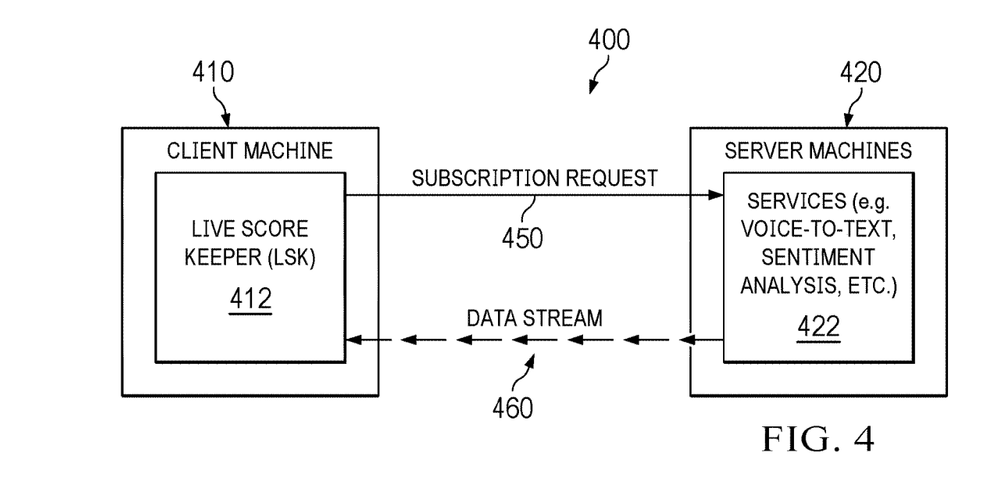

FIG. 4 illustrates an example of how client-side and server-side components work in concert to provide real-time agent performance evaluation and feedback according to some embodiments disclosed herein. In some embodiments, a LSK 412 on a client machine 410 may be notified that a customer call has started. In response, a data flow 400 may include LSK 412 sending a 'subscription request' 450 to a 'Voice To Text and Sentiment Service' 422 provided by a server 420. Voice to Text and Sentiment Service 4220 sets up the plumbing to receive voice packets and send them to a service that converts voice data (e.g., WAV data) to text and a service that analyzes the text for sentiment(s). As a non-limiting example, voices in the call can be recorded as two channels: one for the agent and one for the customer. The sentiment analysis can be performed on the text transcribed from the voice data with respect to the customer, the agent, or both. The text transcribed from the voice data and the sentiment(s) are streamed to LSK 412 via a data stream 460.

Figure 5:
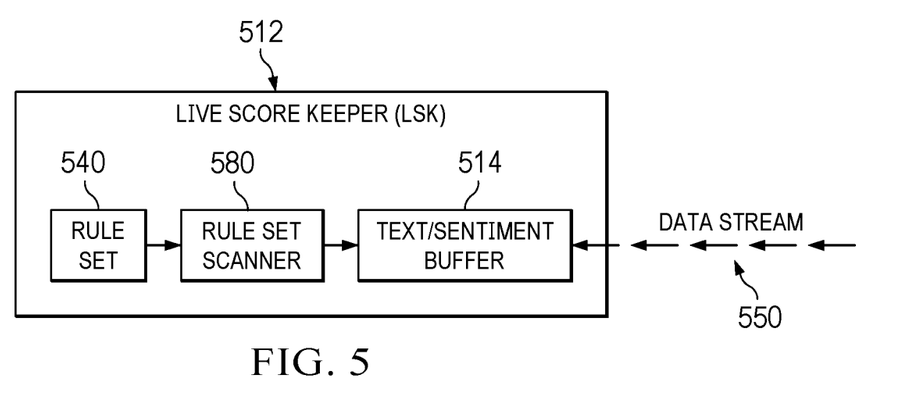

FIG. 5 depicts a diagrammatic representation of an example of LSK 512. In some embodiments, LSK 512 includes a text/sentiment buffer 514, a rule set scanner 580, and a rule set 540. Rule set 540 contains multiple rules that will be processed to determine the agent's performance. Text/sentiment buffer 540 contains all of two text channels and two sentiment channels (one channel for each participant).

In some embodiments, as new data arrive via a data stream 550, text/sentiment buffer 514 grows to maintain a complete call conversation. In some embodiments, rule set scanner 580 scans rules in rule set 540 one rule at a time and applies the rule to the complete set of text/sentiment data in text/sentiment buffer 514.

In some embodiments, the rules in rule set 540 follows a rule syntax:

IF expression THEN PERFORM actions

Expression Examples:

---

IF (agent says 'the standard greeting') THEN PERFORM actions
  // search text for standard greeting
IF (agent sentiment > neutral) THEN PERFORM actions
  // sentiment for last data packet
IF (agent accumulative-sentiment > neutral) THEN PERFORM actions

```
// sentiment since beginning of call
IF (customer sentiment < neutral) THEN PERFORM actions
    // customer is getting dissatisfied.
IF (customer accumulative-sentiment < neutral) THEN PERFORM actions
IF (customer sentiment < neutral ) AND (agent sentiment < neutral)
THEN PERFORM actions
IF (customer says "speak to manager") THEN PERFORM actions
    // customer wants to speak to a manager
IF (agent says "screw you") THEN PERFORM actions
    // agent is getting mad (not good)
IF (agent says "daily special") THEN PERFORM actions
    // agent is trying to up-sell
IF (agent says 'the standard exit greeting') THEN PERFORM actions
    // agent speaks the standard farewell
IF (customer sentiment-since-bookmark > bookmark-sentiment)
THEN PERFORM actions
```

As exemplified above, expressions can be complex Boolean expressions using 'AND', 'OR', and 'NOT' operators. For instance,

```
IF (customer sentiment < neutral) AND (agent sentiment < neutral)
THEN PERFORM actions
IF (agent says "are you interested") AND (customer says "sure | yes")
AND (customer sentiment < neutral) THEN PERFORM actions
IF NOT (agent says "goodbye") AND (call is finished) THEN PERFORM
actions
```

In some embodiments, the LSK is capable of performing standard actions that pertain to: scoring the agent's performance, providing messages to the agent, and setting bookmarks in the conversation.
Action Examples:

| ACTION | Additional Data | Description |
| --- | --- | --- |
| SET SCORE | Number or Negative Number | Increases or decreases the agent's current score for this call. |
| MESSAGE | Text to be displayed | Display a dialog on the screen with the specified text. |
| MANAGER MESSAGE | Text to be displayed | Display a dialog on the manager's screen with the specified text. |
| SET BOOKMARK | Bookmark tag | Set a bookmark in the current conversation. Saves customer and agent sentiment values. |

In some embodiments, actions use an 'add-in' interface that enables customers to create and add their own actions to the LSK.

Figure 6:
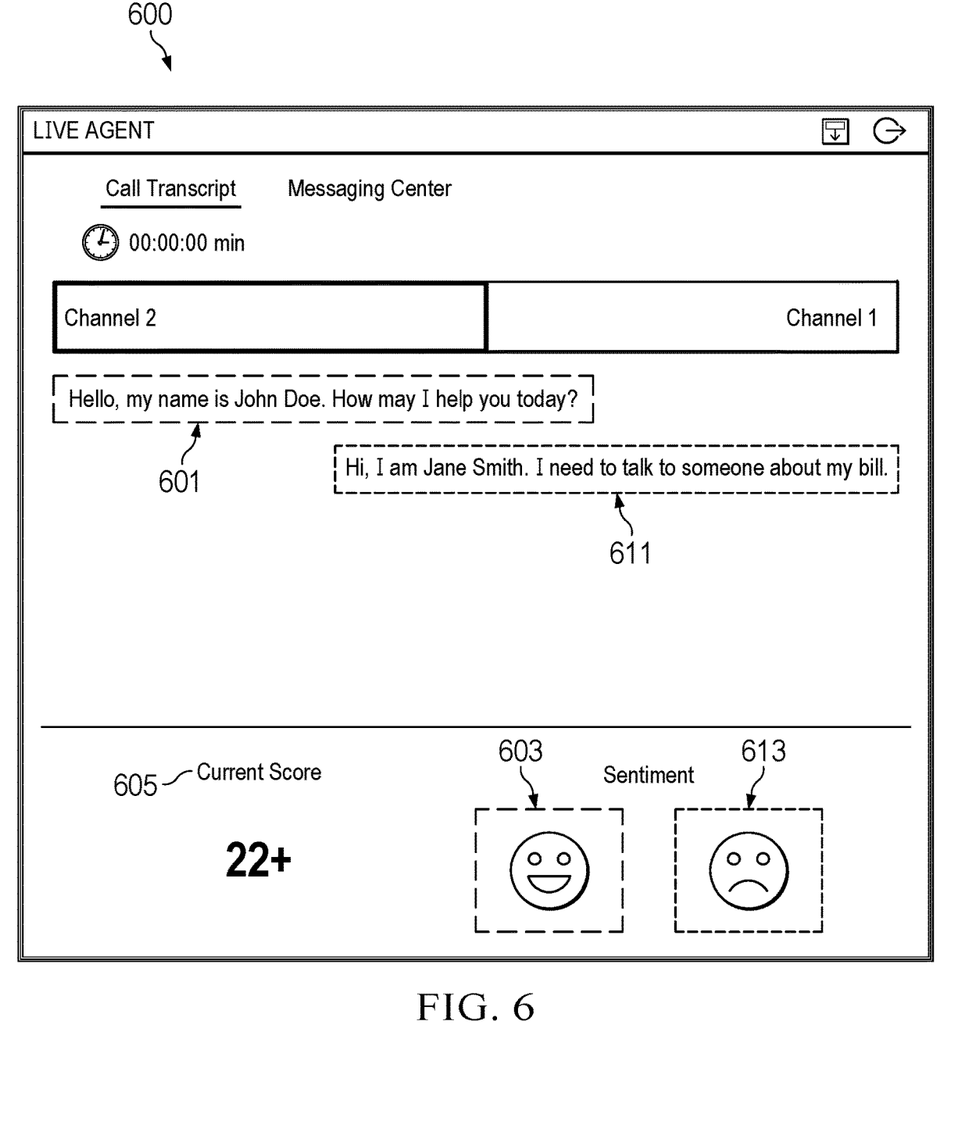

FIG. 6 depicts a diagrammatic representation of an example of a user interface 600 that shows a real-time agent performance score according to some embodiments disclosed herein. As illustrated in FIG. 6, as the call proceeds, the transcript of both channels (601, 611) is displayed to the agent; the current score 605 is displayed, the current agent sentiment 603 is displayed, and the current customer sentiment 613 is displayed.

Figure 7:
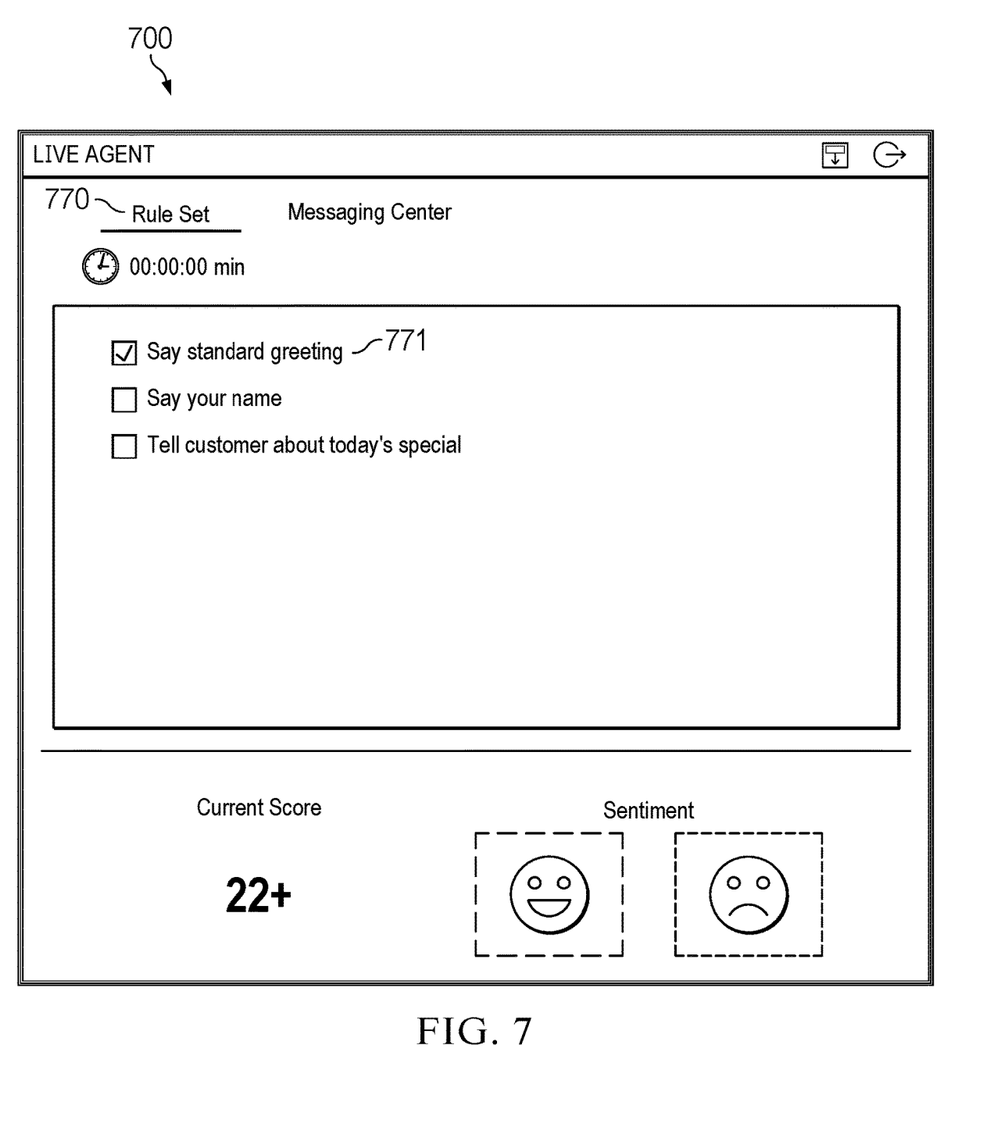

FIG. 7 depicts a diagrammatic representation of an example of a user interface 700 that shows a rule set to an agent as the agent is conversing or chatting with a customer, according to some embodiments disclosed herein. As the call proceeds, rules in a rule set 770 are displayed. As the agent completes a rule (e.g., rule 771), it is checked off.

Upon the end of the call, information is sent to the database via the live score rule service. At a minimum, the stored information includes a history of the scoring as the call progressed, a history of both sentiments of the agent and the customer, a final score, a final sentiment, and executed rules.

Figure 8A:
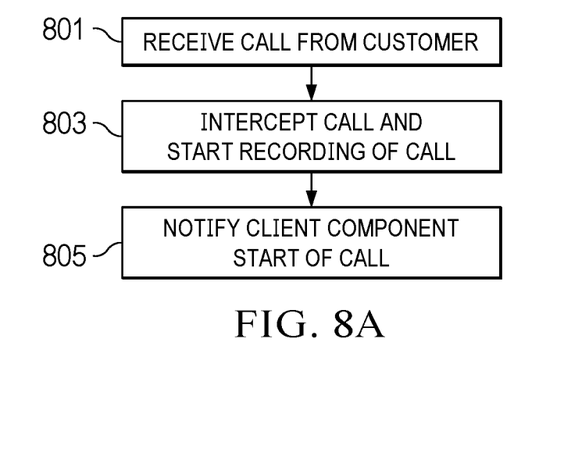
Figure 8B:
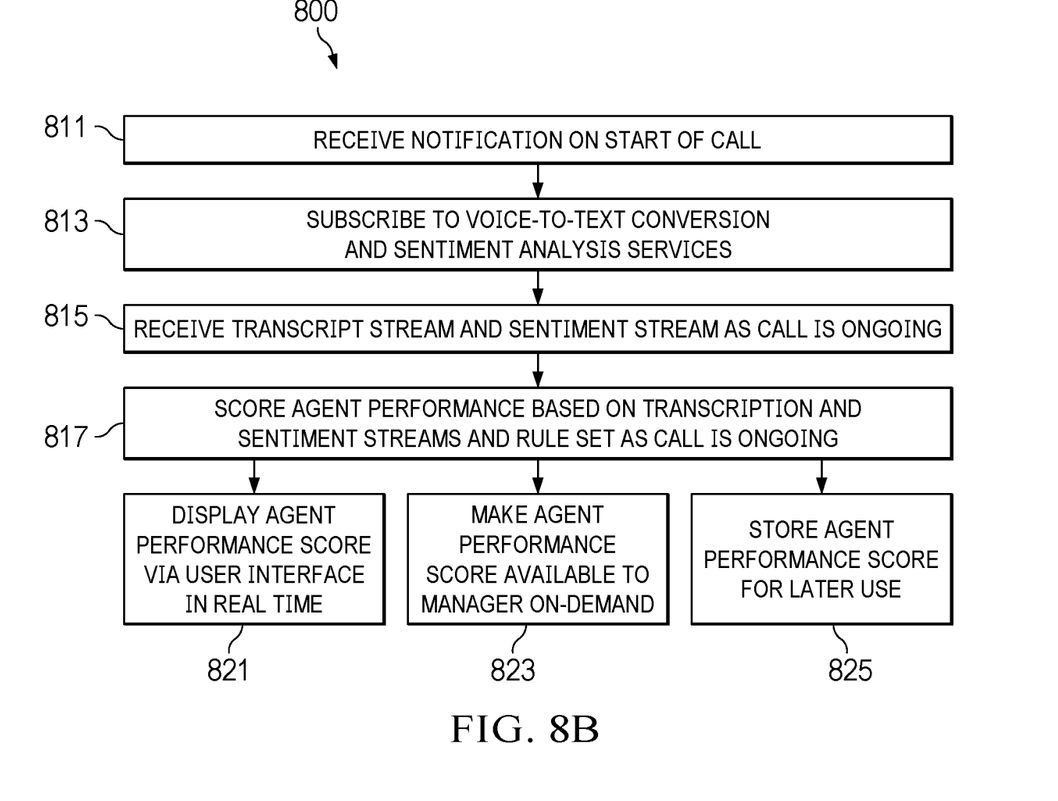

FIGS. 8A-8B are flow charts that illustrate an example of a real-time agent performance evaluation process according to some embodiments disclosed herein. FIG. 8A shows that, on the server side, a server may receive a call from a customer (801). The call may be directed to the server by a call center or the server may operate as part of the call center that receives the call from the customer. The call is intercepted on the server side and recording of the call starts (803). Meanwhile, the server notifies a LSK on the client side that the call has started (805). The LSK may run on a client computer associated with an agent assigned to handle the call. The agent's screen and conversation with the customer is recorded.

This conversation can be a phone conversation or a chat conversation. In some embodiments, chat sessions can be introduced into this process. This can be done by using the ICE (interactive control element) technology to screen scape the chat windows.

FIG. 8B is a flow chart 800 that shows a LSK receiving a notification on the start of a call (811) and, in response, subscribing to voice-to-text conversion and sentiment analysis services (813). As a non-limiting example, these services can be combined into a service.

As the agent and the customer converse, the conversation is being transcribed to text and analyzed for sentiment and summary on the server side as the call is ongoing. The results are streamed to the client side (815). In real time and as the call is ongoing, the LSK scores the agent's performance by applying the locally processed and stored live score rules to the transcribed text of the call and the sentiments streamed from the server side (817). This scoring produces a current score that indicates how well the agent is handling the call at the moment. As illustrated in FIG. 6, the current score (which is also referred to as a live score) can be presented to the agent in real time via a user interface on the agent's computer (821). This gives the agent an immediate feedback on the agent's performance with respect to the particular customer as the agent communicates with the customer. The LSK communicates the live score to the server side (e.g., via a live score rule service) so that the live score can be made available for access by the agent's manager (or other authorized users) on demand and/or in real time (823) and/or stored (e.g., in a database) for later use (825).

The manager can still review and modify the final score and, optionally, review the voice and/or screen recordings of the call. As before, both the manager and the agent can schedule a meeting to review the call and the feedback can be reviewed with both the agent and the manager. However, the manager is no longer required to review or score a recording. This saves time and allows the manager to support more call agents as compared to prior 'post-call' agent evaluation processes. Since computation of scoring is performed on the agent's machine, the work load is distributed, taking the load off of one or more server machines. Further, because the time between agent/customer interaction to feedback is significantly reduced to real time, the agent is aware of the scoring as it happens and can take appropriate action to improve performance. The manager still has a face-to-face review with the agent. However, because of the live score continuously displayed to the agent as the call progresses, the agent already has knowledge of where she stands. Therefore, this computer-implemented agent performance evaluation process can build trust between the manager and the agent.

Figure 9:
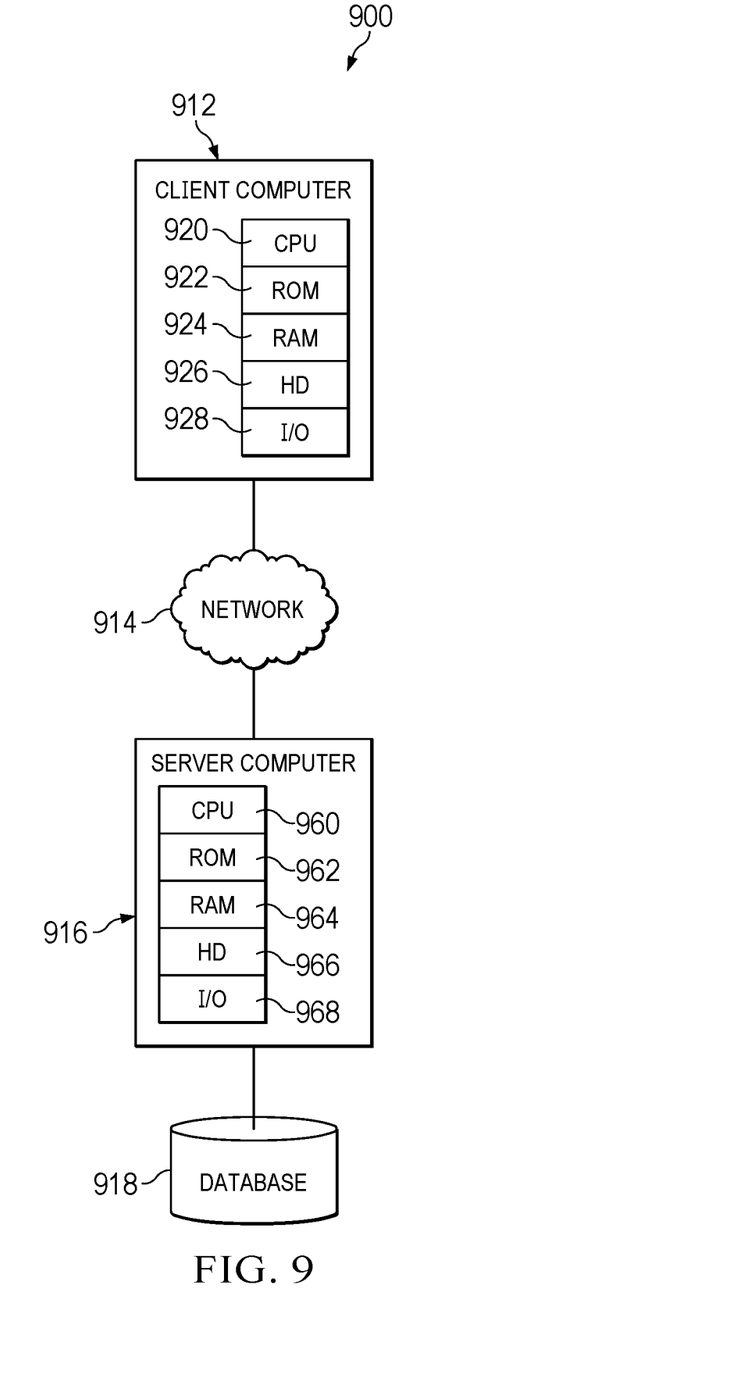

FIG. 9 depicts a diagrammatic representation of a distributed network computing environment where embodiments disclosed can be implemented. In the example illustrated, network computing environment 900 includes network 914 that can be bi-directionally coupled to a client computer 912 and a server computer 916. Computer 916 can be bi-directionally coupled to data store 918. Network 914 may represent a combination of wired and wireless networks that network computing environment 900 may utilize for various types of network communications known to those skilled in the art.

For the purpose of illustration, a single system is shown for each of computer 912 and computer 916. However, with each of computer 912 and computer 916, a plurality of computers (not shown) may be interconnected to each other over network 914. For example, a plurality of computers 912 and a plurality of computers 916 may be coupled to network 914. Computers 912 may include data processing systems for communicating with computers 916. Computers 916 may include data processing systems for agents and managers of call center(s) operating in network computing environment 900.

Computer 912 can include central processing unit ("CPU") 920, read-only memory ("ROM") 922, random access memory ("RAM") 924, hard drive ("HD") or storage memory 926, and input/output device(s) ("I/O") 928. I/O 928 can include a keyboard, monitor, printer, electronic pointing device (e.g., mouse, trackball, stylus, etc.), or the like. Computer 912 can include a desktop computer, a laptop computer, a personal digital assistant, a cellular phone, or nearly any device capable of communicating over a network.

Likewise, computer 916 may include CPU 960, ROM 962, RAM 964, HD 966, and I/O 968. Computer 916 may include one or more backend systems configured for providing content Web services (CWS) over network 914. In some embodiments, activity flow information may be stored in data store or database 918. Many other alternative configurations are possible and known to skilled artisans.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912 and 916 is an example of a data processing system. ROM 922 and 962; RAM 924 and 964; HD 926 and 966; and data store 918 can include media that can be read by CPU 920 or 960. Therefore, these types of memories include non-transitory computer-readable storage media. These memories may be internal or external to computers 912 or 916.

Portions of the methods described herein may be implemented in suitable software code that may reside within ROM 922 or 962; RAM 924 or 964; or HD 926 or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A real-time agent performance evaluation system, comprising:
    server-side components; and
    a client-side component;
    wherein the server-side components comprise a database and servers configured for providing a plurality of services, the plurality of services including a first service and a second service;

wherein the client-side component comprises a user device of an agent, the user device having a user interface;
wherein the user device is configured for:
responsive to a call being started between the agent and a caller, subscribing to the first service and sending voice data from the call to the first service, wherein the voice data is converted to text and the text is analyzed for a sentiment; and
receiving a data stream containing the text and the sentiment from the first service;
generating a score reflective of performance of the agent with respect to the call in real time as the call is ongoing, the generating comprising applying a rule to the text, the sentiment, or a combination thereof; and
displaying the score on the user interface of the user device of the agent as the call is ongoing.

2. The real-time agent performance evaluation system of claim 1, wherein the user device is further configured for, as the call is ongoing, performing:
sending voice packets to the first service;
receiving text data and sentiment data streamed from the first service;
scoring the performance of the agent with respect to the call in real time as the call is ongoing; and
updating the user interface to reflect a result from the scoring.

3. The real-time agent performance evaluation system of claim 2, wherein the user device is further configured for:
once the call ends, sending information to the database via the second service, wherein the information comprises: a history of the scoring as the call progressed, a history of sentiments of the agent and the caller, a final score, a final sentiment, and executed rules.

4. The real-time agent performance evaluation system of claim 1, wherein the user device is further configured for, once the agent is logged into the second service, performing:
fetching a rule set from the second service;
parsing the rule set;
determining what rules are assigned to the agent; and
storing the rules assigned to the agent locally on the user device of the agent.

5. The real-time agent performance evaluation system of claim 1, wherein the user device further comprises a buffer for storing text data and sentiment data for the agent and the caller as the call is ongoing.

6. The real-time agent performance evaluation system of claim 5, wherein the user device further comprises a rule scanner for scanning rules in a rule set one rule at a time and applying each scanned rule to the text data and the sentiment data in the buffer.

7. The real-time agent performance evaluation system of claim 1, wherein the call is intercepted by one of the servers and directed to the user device of the agent and wherein the call comprises a phone conversation or a chat conversation.

8. A real-time agent performance evaluation method, comprising:
responsive to a call being started between an agent and a caller, subscribing to a first service and sending voice data from the call to the first service, wherein the voice data is converted to text and the text is analyzed for a sentiment, wherein the subscribing is performed by a client-side component on a user device of the agent, wherein the first service is one of a plurality of services provided by server-side components; and
receiving, by the client-side component on the user device of the agent, a data stream containing the text and the sentiment from the first service;
generating, by the client-side component on the user device of the agent, a score reflective of performance of the agent with respect to the call in real time as the call is ongoing, the generating comprising applying a rule to the text, the sentiment, or a combination thereof; and
displaying, by the client-side component on the user device of the agent, the score on a user interface of the user device of the agent as the call is ongoing.

9. The real-time agent performance evaluation method according to claim 8, further comprising:
performing, by the client-side component on the user device of the agent as the call is ongoing:
sending voice packets to the first service;
receiving text data and sentiment data streamed from the first service;
scoring the performance of the agent with respect to the call in real time as the call is ongoing; and
updating the user interface to reflect a result from the scoring.

10. The real-time agent performance evaluation method according to claim 9, further comprising:
once the call ends, sending information to the database via a second service of the plurality of services, wherein the information comprises: a history of the scoring as the call progressed, a history of sentiments of the agent and the caller, a final score, a final sentiment, and executed rules.

11. The real-time agent performance evaluation method according to claim 8, further comprising:
performing, by the client-side component on the user device of the agent once the agent is logged into a second service of the plurality of services:
fetching a rule set from the second service;
parsing the rule set;
determining what rules are assigned to the agent; and
storing the rules assigned to the agent locally on the user device of the agent.

12. The real-time agent performance evaluation method according to claim 8, wherein the client-side component on the user device of the agent further comprises a buffer for storing text data and sentiment data for the agent and the caller as the call is ongoing.

13. The real-time agent performance evaluation method according to claim 12, wherein the client-side component on the user device of the agent further comprises a rule scanner for scanning rules in a rule set one rule at a time and applying each scanned rule to the text data and the sentiment data in the buffer.

14. The real-time agent performance evaluation method according to claim 8, wherein the call comprises a phone conversation or a chat conversation.

15. A computer program product for real-time agent performance evaluation, the computer program product comprising a non-transitory computer-readable medium storing instructions translatable by a client-side component on a user device of an agent to perform:
responsive to a call being started between an agent and a caller, subscribing to a first service and sending voice data from the call to the first service, wherein the voice data is converted to text and the text is analyzed for a sentiment, wherein the first service is one of a plurality of services provided by server-side components; and
receiving a data stream containing the text and the sentiment from the first service;

generating a score reflective of performance of the agent with respect to the call in real time as the call is ongoing, the generating comprising applying a rule to the text, the sentiment, or a combination thereof; and displaying the score on a user interface of the user device of the agent as the call is ongoing.

16. The computer program product of claim 15, wherein the instructions are further translatable by the client-side component on the user device of the agent to perform, as the call is ongoing:

sending voice packets to the first service;

receiving text data and sentiment data streamed from the first service;

scoring the performance of the agent with respect to the call in real time as the call is ongoing; and updating the user interface to reflect a result from the scoring.

17. The computer program product of claim 16, wherein the instructions are further translatable by the client-side component on the user device of the agent to perform:

once the call ends, sending information to the database via a second service of the plurality of services, wherein the information comprises: a history of the scoring as the call progressed, a history of sentiments of the agent and the caller, a final score, a final sentiment, and executed rules.

18. The computer program product of claim 15, wherein the instructions are further translatable by the client-side component on the user device of the agent to perform, once the agent is logged into a second service of the plurality of services:

fetching a rule set from the second service;

parsing the rule set;

determining what rules are assigned to the agent; and storing the rules assigned to the agent locally on the user device of the agent.

19. The computer program product of claim 15, wherein the client-side component on the user device of the agent further comprises:

a buffer for storing text data and sentiment data for the agent and the caller as the call is ongoing; and a rule scanner for scanning rules in a rule set one rule at a time and applying each scanned rule to the text data and the sentiment data in the buffer.

20. The computer program product of claim 15, wherein the call comprises a phone conversation or a chat conversation.

* * * * *